(12) United States Patent
Rubin et al.

(10) Patent No.: US 8,520,010 B2
(45) Date of Patent: Aug. 27, 2013

(54) LATENCY SOLUTIONS

(75) Inventors: Amir Rubin, Los Gatos, CA (US); Jeffrey Peter Bellinghausen, San Jose, CA (US)

(73) Assignee: Sixense Entertainment, Inc., Los Gatos, CA (US)

(*) Notice: Subject to any disclaimer, the term of this patent is extended or adjusted under 35 U.S.C. 154(b) by 413 days.

(21) Appl. No.: 12/848,928

(22) Filed: Aug. 2, 2010

(65) Prior Publication Data

US 2011/0028210 A1 Feb. 3, 2011

Related U.S. Application Data

(60) Provisional application No. 61/230,702, filed on Aug. 1, 2009.

(51) Int. Cl.
*G06F 15/00* (2006.01)

(52) U.S. Cl.
USPC ........... 345/501; 345/502; 345/503; 345/504; 345/505; 345/522; 643/30

(58) Field of Classification Search
USPC ............ 345/501, 467–470, 649, 689; 463/30
See application file for complete search history.

(56) References Cited

U.S. PATENT DOCUMENTS

| 6,867,781 B1 * | 3/2005 | Van Hook et al. | 345/506 |
| 2002/0032058 A1 * | 3/2002 | Sugimura | 463/43 |

OTHER PUBLICATIONS

Barkans, Anthony C. "High quality rendering using the talisman architecture," Proceedings of 1997 ACM SIGGRAPH/Eurographics Workshop on Graphics Hardware, Los Angeles, CA, Aug. 3-4, 1997, pp. 79-88.

Breglia Denis R. et al., "Helmet mouned laser projector" Poceedings of The 1981 Image Generaion/Display, Conference II, Jun. 10-12, 1981, Scottsdale, AZ, pp. 241-258.

Bryson, Steve et al., "Time management, simultaneity and time-critical computation in interactive unsteady visualization environments," Proceedings of Visualization '96, IEEE Computer Society Technical Committee on Computer Graphics and ACM SIGGRAPH, Oct. 27-Nov. 1, 1996, San Francisco, CA, pp. 255-261.

Burbridge, Dick et at, "Hardware improvements to the helmet mounted projector on the visual display research tool (VDRT) at the Naval Training Systems Center," Rediffusion Simulation Limited, Crawley, West Sussex, England, RH10 2RL, SPIE 1116:52-60, Sep. 1, 1989.

Hill, Michael I. et al.,"Achieving minimum latency in virtual environment applications," Proceedings of iIMAGE 2004 Conference, Scottsdale, AZ, Jul. 2004.

(Continued)

*Primary Examiner* — Ke Xiao
*Assistant Examiner* — Kim-Thanh T Tran
(74) *Attorney, Agent, or Firm* — Gard & Kaslow LLP

(57) ABSTRACT

In processing a game scene for display, in one embodiment input controller position information from a host memory is provided directly to a graphics processor rather than first being processed by a 3D application in a host processor. This results in more direct and timely processing of position information and reduces the number of 3D processing pipeline steps the controller position information must pass through thus reducing the user's perceived latency between moving the input controller and seeing the displayed results. In another embodiment, the input controller position information is provided directly from an input controller to a graphics card or subsystem rather than first going through a host processor or memory. This results in even more direct and timely processing of position information by further reducing the number of 3D processing pipeline steps the controller position information must pass through thus further reducing the user's perceived latency.

8 Claims, 4 Drawing Sheets

(56) References Cited

OTHER PUBLICATIONS

Jacoby, Richard H. et al., "Improved temporal response in virtual environments through system hardware and software reorganization," Proceedings of SPIE Conference on Stereoscopic Displays and Virtual Reality Systems III, San Jose, CA, 2653:271-284, Jan. 30-Feb. 2, 1996.

Jerald, Jason et al., "Latency compensation by horizontal scanline selection for head-mounted displays," Proceedings of SPIE Conference on Stereoscopic Displays and Virtual Reality Systems XIV, San Jose, CA, Jan. 29-Mar. 1, 2007, 6490(1Q):1-11.

Kano, Hiroyuki et al., "Reflex head mounted display: head mounted display for virtual reality with time lag compensation," Proceedings of Tenth International Conference on Virtual Systems and Multimedia (VSMM), Japan, 2004.

Kijima, Ryogo et al., "Reflex HMD to compensate lag and correction of derivative deformation," Poceedings of International Conference on Virtual Reality 2002, pp. 172-179.

Kijima, Ryugo et al., "A development of reflex HMD—HMD with time delay compensation capability," Proceedings of International Symposium on Mixed Reality 2001, Yokohama Japan, Mar. 14-15, 2001, pp. 1-8.

Mark, William R. et al., "Post-rendering 3D warping," Proceedings of 1997 Symposium on Interactive 3D Graphics, Providence, R.I., ACM SIGGRAPH, pp. 7-16, Apr. 27-30, 1997.

Mazuryk Tomasz et al., "Two-step prediction and image deflection for exct head tacking in virual envionments," Proceedings of EUROGRAPHICS '95, Dublin, Ireland, 14(3):29-41, Jun. 12-14, 1995.

Mine, Mark et al., "Just-in-time pixels," University of North Carolina at Chapel Hill, North Carolina, USA, 1995.

Murray, P.M. et al., "Visual display research tool," Proceedings of AGARD Conference Proceedings No, 408, Flight Simulation Symposium, 1985.

Olano, Marc et al., "Combatting rendering latency," Proceedings of 1995 Symposium on Interactive 3D Graphics, Monterey, CA, pp. 19-24, Apr. 9-12, 1995.

Regan, Matthew et al., "Priority rendering with a virtual reality address recalculation pipeline," Proceedings of Computer Graphics Annual Conference Series, SIGGRAPH 1994, Orlando, FL, Jul. 24-29, 1994, pp. 155-162.

Regan, Matthew J. P. et al., "A real-time low-latency hardware lightfield renderer" Proceedings of Computer , Graphics Annual Conference Series, SIGGRAPH 1999, Los Angeles, CA, Aug. 8-13, 1999, pp. 287-290.

So, Richard H. Y. et al., "Compensating lags in head-coupled displays using head position prediction and image deflection," Journal of Aircraft, 29(6):1064-1068, Nov.-Dec. 1992.

Torborg, Jay, et al., "Talisman: Commodity realtirne 3D graphics for the PC," Proceedings of SIGGRAPH 1996, Aug. 4-9, 1996. New Orleans, LA. pp. 353-363.

Yanagida, Yasuyuki et al., "Improvement of temporal quality of HMD for rotational motion," Proceedings of the 7th IEEE International Workshop on Robot and Human Communication (RO-MAN '98), pp. 121-126, Takamatsu Japan, Oct. 1998.

\* cited by examiner

LATENCY SOLUTIONS

CROSS-REFERENCE TO RELATED APPLICATIONS

This application claims the benefit of U.S. Provisional Patent Application No. 61/230,702 filed on Aug. 1, 2009 and entitled "Latency Solutions," which is incorporated herein by reference in its entirety.

BACKGROUND

1. Field of the Invention

The field of this invention is in the area of computer input devices, including video game controllers, and more particularly to responsiveness of systems receiving signals from such input devices.

2. Related Art

As the market for and variety of video games has increased, so has the demand for video game controllers. Early controllers were typically trackballs in a fixed mount thus requiring the user or game player to remain fairly stationary while playing the video game. Seeking to give the game player more freedom of movement as well as a greater range of video game input control, still later controllers were handheld and later, some incorporated accelerometers to determine controller movement. Other, external detectors have also been used to detect controller movement. Such external detectors include ultrasound and optical mechanisms that attempt to track movement of a controller in a field of view. A more advanced form of controller known in the art utilizes magnetic fields. Magnetic coils in these controllers detect the presence of a magnetic field to determine position and orientation of the controller. Some of these controllers consist of two parts, a controller part and a base unit part, which communicate with each other wirelessly.

Regardless of the type of controller used, ideally there is minimal delay between the user's movement and the resulting response on the display screen. Any noticeable delay can interfere with their ability to interact with the game. Avoiding such noticeable delays helps maintain the user's illusion of being "in the game" thus ensuring a seamless gaming experience Modern'three-dimensional (3D) applications and systems, as used in many video games, have a very deep pipeline of operations that result in the final image on the display screen. This pipeline allows the game system to draw many frames in quick succession. However, the deeper the pipeline the longer it takes for a given frame to be created and displayed. This can interfere with the user's desired seamless gaming experience.

What is needed, therefore, is an improved pipeline approach for 3D applications which reduces the time taken to process and display the results of a user's movement of a game input controller.

SUMMARY

An improved system and method for generating a 3D scene is disclosed which takes input position information directly into a graphics processor, either through a host memory or via a direct to 3D graphics card or subsystem connector, for processing of the input position information by the graphics processor in combination with scene elements generated by a host processor thus eliminating a number of the 3D pipeline processing steps for the position information thereby reducing the latency between when a user moved the controller and sees the displayed result.

An exemplary method for generating a video game scene comprises: processing a video game application in a host processor to generate a video game scene; receiving input controller position information into a memory of the host processor; retrieving, by a graphics processor, the input controller position information from the memory of the host processor; processing the generated game scene in the graphics processor using the retrieved input controller position information to generate a final video game scene; and outputting the final video game scene to a display device.

An exemplary system for generating a video game scene comprises: a host processor configured to generate a video game scene; a host processor memory configured to store input controller position information received from an input controller; and a graphics processor configured to receive the generated video game scene, configured to retrieve the stored input controller position information, and configured to process the generated video game scene using the retrieved input controller position information.

An exemplary method for generating a video game scene comprises: processing a video game application in a host processor to generate a video game scene; receiving input controller position information from an input controller into a memory of a graphics processor without the input controller position information first going through a memory of the host processor; processing the generated game scene in the graphics processor using the input controller position information from the memory of the graphics processor to generate a final video game scene; and outputting the final video game scene to a display device.

An exemplary system for generating a video game scene comprises: a host processor configured to generate a video game scene; a graphics card configured to receive input controller position information from an input controller; a graphics memory located on the graphics card configured to store the received input controller position information; and a graphics processor located on the graphics card configured to receive the generated video game scene, configured to retrieve the stored input controller position information from the graphics memory, and configured to process the generated video game scene using the retrieved input controller position information.

DETAILED DESCRIPTION

Figure 1:
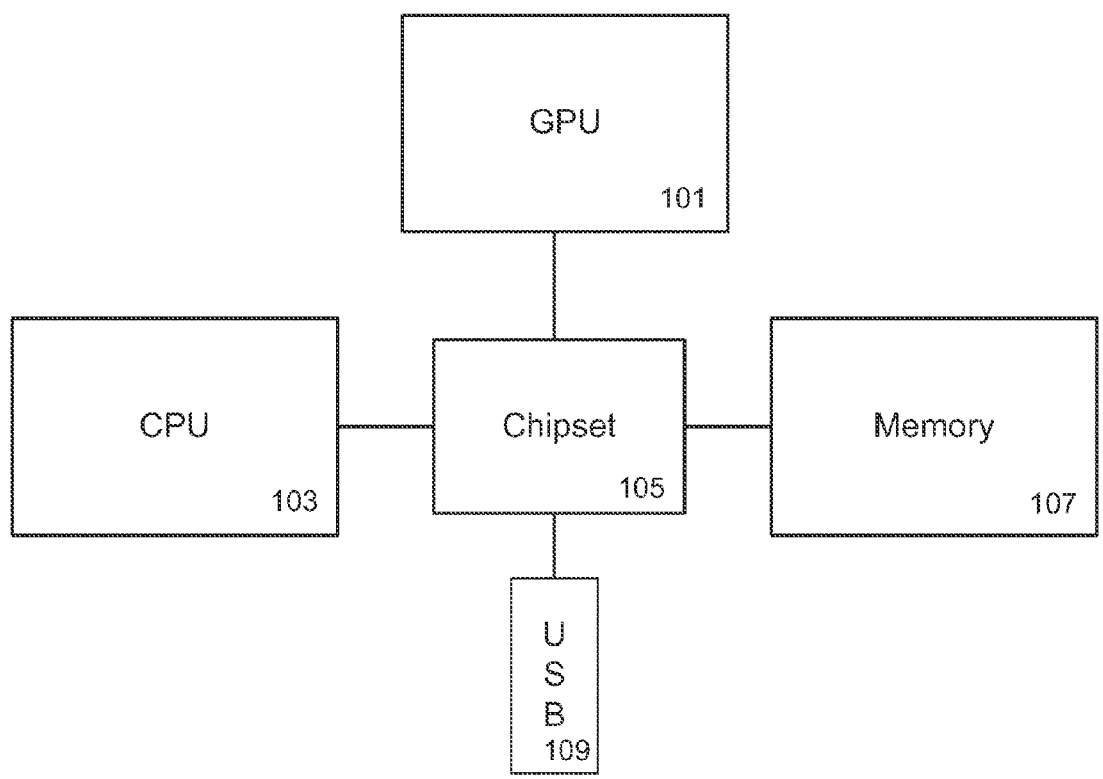
FIG. 1 is a block diagram of a video game system as may be used in various embodiments.

Referring now to FIG. 1, a block diagram of a video game system as may be used in embodiments of the present invention can be seen. Here, a Graphics Processing Unit (GPU) 101, a Central Processing Unit (CPU) 103, a Memory 107, and a Universal Serial Bus (USB) connector 109 are all coupled via a Chipset 105. As is known in the art, a game application running on CPU 103 uses data and instructions received across Chipset 105 from Memory 107 to generate graphics elements for the game being played. These graphics elements are then sent across Chipset 105 to GPU 101 for further processing so they can ultimately be shown on a display device such as a television or computer screen (not shown).

Further, as is also known in the art, when a game user moves a game input controller (not shown) coupled to USB connector 109, controller position information is received by USB connector 109 from the input controller and this controller position information passes through Chipset 105 and is placed in Memory 107. Later, when the game application running on CPU 103 is ready to update the displayed scene for the game, the controller position information is retrieved by CPU 103 via Chipset 105 from Memory 107. The game application running on CPU 103 then uses the controller position information to determine the position or location of what is referred to herein as a key scene element (i.e., whatever display element is being directly controlled by the motion of the controller, e.g., the game user's character and/or instrument such as a bat, sword, gun, three dimensional (3D) cursor, etc.) in the game scene being generated. CPU 103 outputs the newly generated game scene primitives, including the user's character and/or instrument, to GPU 101 via Chipset 105. GPU 101 then performs further graphics processing on the game scene primitives and, ultimately, outputs a final game scene for display on a display device (not shown).

This time period between when a user moves a game input controller and when the resulting change in displayed character and/or instrument is displayed is referred to herein as "latency." Unfortunately, in the prior art, this latency can be long enough to cause a noticeable delay which can interfere with the user's ability to interact with the game.

In one embodiment of the present invention, known herein as a software reduced latency solution, the controller position information from Memory 107 is provided directly to GPU 101, rather than first going through CPU 103, which results in more direct and timely processing of this position information than occurs in the standard latency approach of the prior art. The number of pipeline steps the controller position information must pass through is thereby reduced and since the controller position information does not have to first go through CPU 103 to be included in the graphic scene generation by the game application running on CPU 103, GPU 101 can receive newer or more recent controller position information when performing the further graphics processing on the game scene that was generated by CPU 103. This results in a more direct and timely processing of the input controller position information and reduces the user's perceived latency.

In another embodiment of the present invention, known herein as a hardware reduced latency solution, the controller position information is provided directly from an input controller to a graphics card or subsystem, including a graphics processor such as GPU 101 and a graphics memory (not shown), rather than first going through CPU 103 or Memory 107. This results in an even more direct and timely processing of this position information than occurs in either the software reduced latency solution or in the standard latency approach of the prior art. The number of pipeline steps the controller position information must pass through is thereby still further reduced and since the controller position information does not have to first go through CPU 103 or Memory 107 to be included in the graphic scene processing running on GPU 101, GPU 101 can receive even newer or more recent controller position information when performing the further graphics processing on the game scene that was generated by CPU 103. This results in an even more direct and timely processing of the input controller position information thus further reducing the user's perceived latency.

Figure 2:
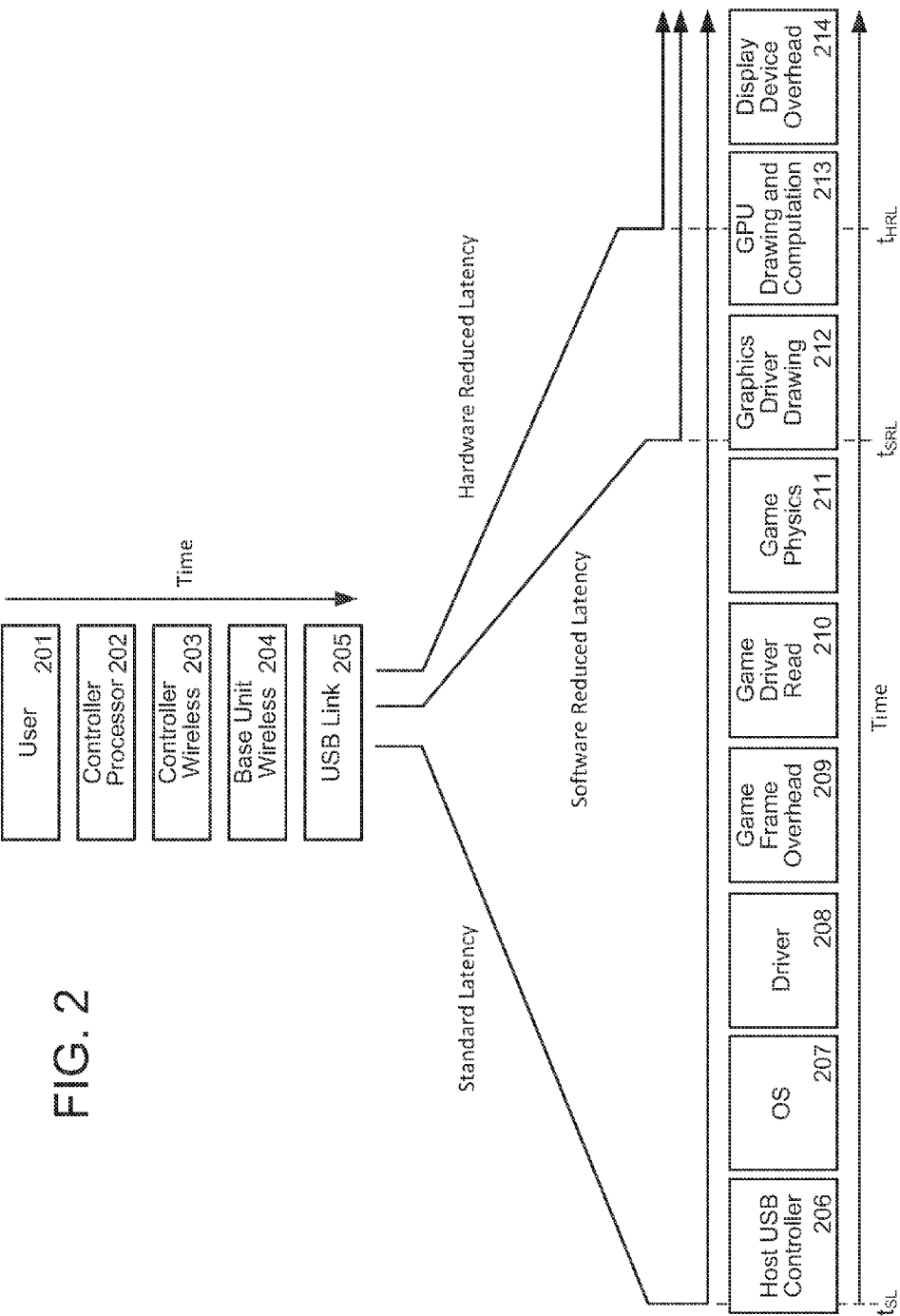
FIG. 2 is a block diagram of a 3D graphics pipeline showing a known standard latency approach, a software reduced latency solution and a hardware reduced latency solution according to various embodiments.

Referring now to FIG. 2, a block diagram can be seen of a 3D graphics pipeline showing the known standard latency approach, the software reduced latency solution and the hardware reduced latency solution according to various embodiments.

A typical Personal Computer (PC)/game console/system (host) used for real-time 3D applications generally performs the following sequence of steps to read user input and display its effect on a display screen. This sequence is known as a pipeline and it includes processing in the input controller, the host Operating System (OS), the game application and the graphics subsystem as will be described.

In step 201, a game player user interacts with the game input controller by, for example, swinging the controller like a baseball bat.

In step 202, the user's movement of the game input controller is recognized by the internal electronics of the controller.

In step 203, the game input controller sends the new input controller position information wirelessly to a game input controller base unit or Radio Frequency (RF) Dongle.

In step 204, the game input controller base unit or RF Dongle receives the new input controller position information wirelessly from the game input controller.

In step 205, the game input controller base unit sends the new input controller position information across a USB link to the host USB controller (e.g., USB 109 of FIG. 1).

In step 206, the host USB controller receives the new input controller position information and passes it to the host CPU (e.g., CPU 103 of FIG. 1). The host OS, upon receiving the data and after some period of time dependent upon the real-time nature of its processing, notifies an input device driver of the newly arrived data.

In step 207, the input device driver copies the new input controller position information from a host CPU system buffer into its own memory space (e.g., in Memory 107). The new input controller position information is now stored in memory ready to be queried by an application running on the host CPU.

Meanwhile, in step 209 the game application has been running on the host CPU completing generating a current frame of graphics so it ignores the new input controller position information for a while until it is ready to begin generating the next frame of graphics.

Once the current frame of graphics is complete, the game application's main loop begins generating the next frame. Typically, it is at the beginning of the loop that the game application queries the driver for new input controller position information in step 210.

The game application then uses this new input controller position information to compute the composition of the next game scene. For example, the position of the baseball bat for this next frame can now be computed. This new input controller position information is used to position the full 3D model of the baseball bat in the correct position.

Now that the baseball bat's position is known, in step 211 various other physical effects can be computed by the game application's physics engine. For example, if the new baseball bat position caused a collision with a baseball, the baseball's trajectory can be computed. Computing the new baseball trajectory can be quite sophisticated, taking into account material properties of the baseball and baseball bat, atmospheric effects due to the air around the baseball, as well as the kinematic situation due to the baseball's spin and trajectory. The specific interaction to the motion is not important to note, but what is significant is that this interaction is typically compute-intensive and is therefore done by the host's main processor, the CPU (e.g. CPU 103 of FIG. 1).

Once the physics simulation is complete, the full scene composition is complete. At this point, every visual detail of the scene is set or frozen and is exactly as it will be seen by the user when it is later displayed on the graphics display. Thus, in step 212, the driver outputs the scene information to memory (e.g., Memory 107) for use by the graphics processor (e.g., GPU 101). Note, however, that the baseball bat is in an already-old position queried from the device driver because the user will likely have further moved the controller in the meantime. As such, it is not unlikely that still newer input controller position information has arrived via USB and is available to the driver but since the game application only queries at the beginning of its main loop, that newer position information is not yet available to the game application and will not (yet) be used. Furthermore, there remains some period of time left before this newly composed scene will be presented to the user on the display, and several more recent instances of game controller input position information will become available in the meantime, but they will all go unused in the new scene composition since, again, it is set or frozen at this point in time.

The game application now knows where all the scene components should be placed and therefore completes the 'application update' phase of its main loop and begins the 'graphics draw' phase which consists of communicating with the graphics card driver every detail of the scene.

In steps 212 through 213, what the graphics processor and associated graphics subsystem components do with the scene description from this point varies from host system to host system, but it can take some time for the completed scene to complete being drawn. This time is typically taken by a graphics driver's optimization of the scene primitives into optimal display lists or by pipelining in the graphics processor (e.g., GPU 101 of FIG. 1).

In the past, graphics processors were only capable of drawing a scene exactly as described by the game application. Every detail of object placement in the scene had to be computed by the host CPU (e.g., CPU 103 of FIG. 1). Today, due to the complexities of computing dynamic geometry such as smoke, water or crashed car fenders, modern graphics processors (e.g., GPU 101 of FIG. 1) apply their highly-parallel computation abilities directly to geometric primitives. This means that the host CPU (e.g., CPU 103 of FIG. 1) can simply indicate that water is to be placed in some area of the scene and leave it up to the graphics processor to compute every wave and splash. This computation is done via a special language that runs on the graphics processor. This is known as programming with shaders and examples of such languages include OpenGL Shading Language (GLSL) and High Level Shader/Shading Language (HLSL).

In step 214, once the graphics processor is done drawing the scene, that is, after completion of the 'graphics draw phase,' the scene is ready to be displayed on the display screen. This can only happen when the graphics display screen is ready to draw a next frame, so the screen image may still wait a bit until the graphics display is ready for it. Even after being handed over to the graphics display, modern graphics displays (e.g., televisions), may wait even longer before they actually show the image.

This standard latency pipeline approach sequence commonly results in latency for simple controller button presses of upwards of 200 milliseconds. However, using the software reduced latency solution, the game input controller position information bypasses the host CPU (e.g., CPU 103 of FIG. 1) and, instead, is received and processed directly by the graphics processor (e.g., GPU 101 of FIG. 1) for latency-critical objects (i.e., key scene elements) such as the baseball bat. This means that such objects can be positioned using more recent game input controller position information in Step 212 as described above, thereby removing the operations of steps 206-211 from the total latency. Thus, the total latency of the software reduced latency solution reduces the total latency by the difference in time between time $t_{SL}$ (time Standard Latency) and time $t_{SRL}$ (time Software Reduced Latency), as shown in FIG. 2.

Note further that, in one embodiment, having the graphics processor (e.g., GPU 101 of FIG. 1) retrieve the game input controller position information directly from memory (e.g., Memory 107 of FIG. 1) can be accomplished by programming the graphics card driver to retrieve this information. Such programming can operate by inserting retrieved newer (more recent) controller position information into the graphics scene geometry as specified by the shader language or replacing older (less recent) controller position information previously placed in the game scene graphics geometry by the host CPU (e.g., CPU 102) according to a standard latency approach processing.

Figure 3:
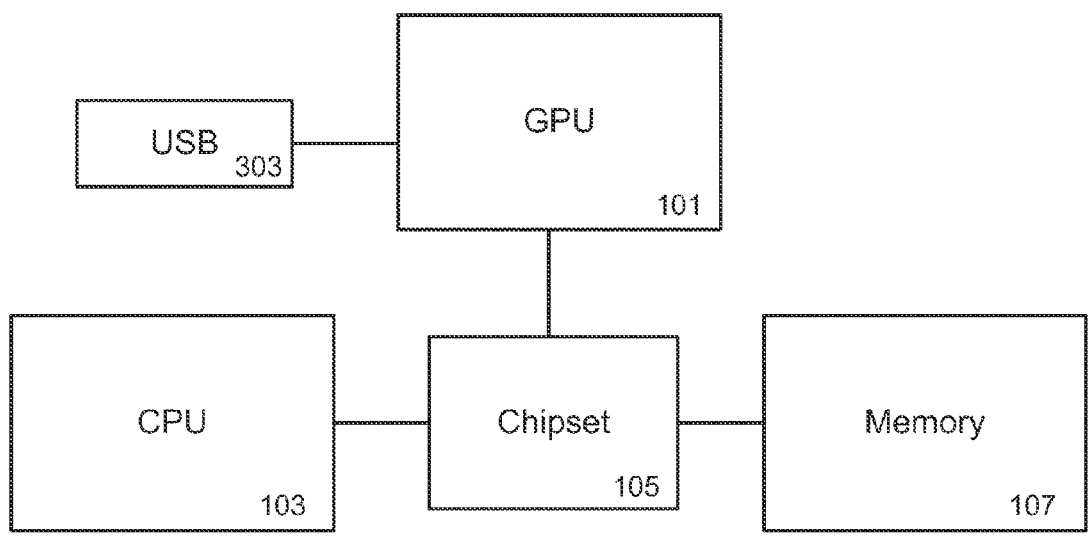
FIG. 3 is a block diagram of a video game system according to a hardware reduced latency solution according to various embodiments.

Referring now to FIG. 3, a block diagram of a video game system according to the hardware reduced latency solution according to various embodiments of the present invention can be seen. Here, the same GPU 101, CPU 103, Chipset 105 and Memory 107 as described with reference to FIGS. 1 and 2 can be seen. Also shown is USB 303 which is a USB graphics game port for direct coupling of a game input controller (not shown) to GPU 101. In the hardware reduced latency solution, game input controller position information is thus fed directly to GPU 101 without first going through Chipset 105, being stored in Memory 107 or necessarily being processed by CPU 103. Such direct coupling of game input controller position information to a graphics card or subsystem facilitates further reductions in the overall latency as will be described.

Figure 4:
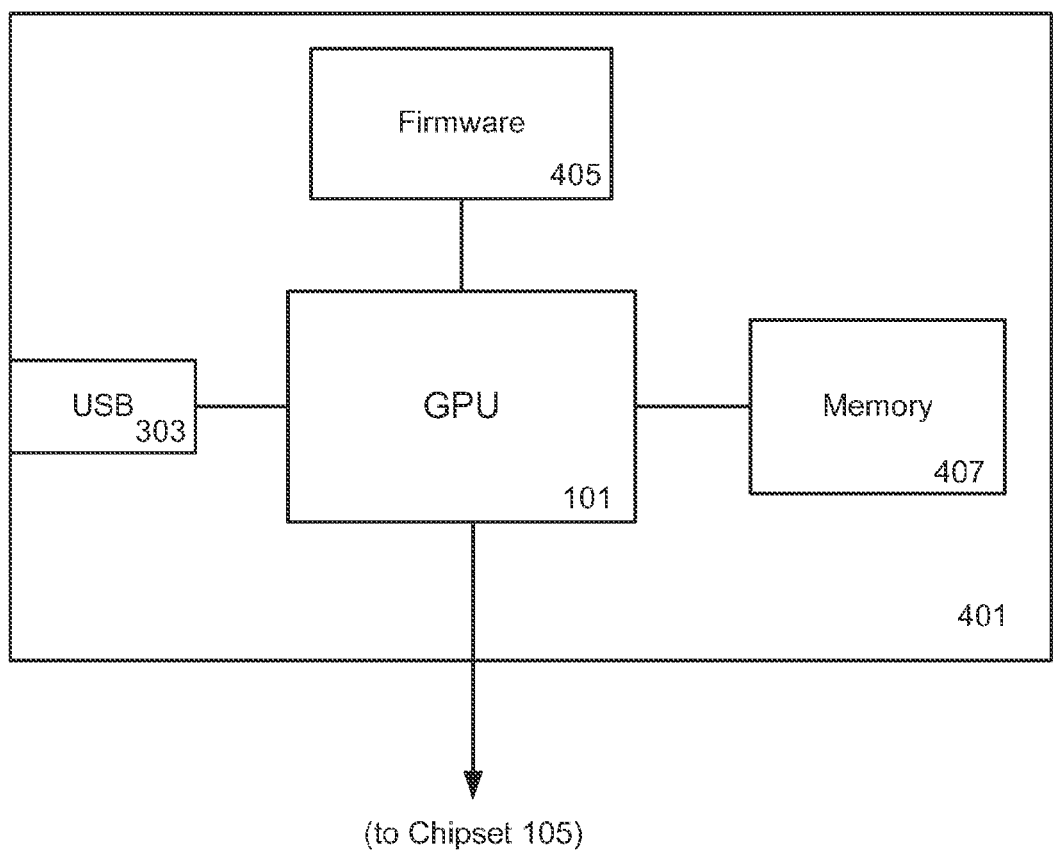
FIG. 4 is a block diagram showing elements of a graphics card as may be implemented in the video game system of FIG. 3.

Referring now to FIG. 4, a block diagram showing elements of a graphics card 401 as may be implemented in the video game system of FIG. 3 can be seen. Graphics processors (e.g., GPU 101 of FIGS. 1 and 3) are commonly placed on a physically separate circuit board from a host processor (e.g., CPU 103 of FIGS. 1 and 3). This separate circuit board is commonly referred to as a graphics card because its main function is graphics processing. It is to be understood that GPU 101 of FIGS. 1 and 3 could likewise be located on such a graphics card despite not being explicitly shown as such in those figures. It is also to be understood that the graphics card components and functionality described herein could be a graphics subsystem co-located with a host processor (e.g., CPU 103 of FIGS. 1 and 3) and host memory (e.g., Memory 107 of FIGS. 1 and 3) without departing from the spirit and scope of the present invention.

In the embodiment shown, graphics card 401 contains GPU 101 coupled to USB 303, Firmware 305 and Memory 307. Firmware 305 is the programmable controlling logic for GPU 101 and Memory 407 is the working memory for GPU 101, as is known in the art. USB 303 is essentially the same graphics game port as described with reference to FIG. 3 although, of course, other known input communication mechanisms and approaches could likewise be used. As also shown, GPU 101 is in communication with a chipset (e.g., Chipset 105 of FIGS. 1 and 3) of a host processor (e.g., CPU 103 of FIGS. 1 and 3) using any known Input/Output (I/O) Bus architecture such as PCI (Peripheral Component Interconnect) Express.

In the hardware reduced latency solution, USB 303 receives game controller position information from a game controller coupled thereto (not shown). This game controller position information is stored in Memory 407 as directed by Firmware 405. Then, when GPU 101 is drawing the scene to be displayed (e.g., in Step 213 of FIG. 2), Firmware 405 retrieves this stored position information and provides it to GPU 101. This can be implemented as vertex shader extensions in Firmware 405 to retrieve the stored position information in a form known in the art as a transformation matrix representing the controller position.

The hardware reduced latency solution has the benefit of providing GPU 101 with game input controller position information at the last possible moment in the game scene drawing calculations and with the most recently available game input controller position information since it did not have to go through multiple other components and processing before being accessed and used. Using the hardware reduced latency solution thus bypasses pipeline Steps 206 through 212 of FIG. 2 thereby reducing the total latency by the difference in time between time $t_{SL}$ (time Standard Latency) and time $t_{HRL}$ (time Hardware Reduced Latency).

It is to be noted that the game controller input position information can also be passed to the host CPU (e.g., CPU 103 of FIGS. 1 and 3), via Chipset 105 either directly from USB 303 or from Memory 407, so that the game application running on the host CPU can also incorporate this position information into its graphics scene processing as needed or desired.

It is to be understood that various alternative embodiments and sequences of operation are to be included in the scope of the present invention. It is to be understood that the present approach can also be utilized for some process other than operation of a video game. In such event, the apparatus and operations described herein are equally applicable to player or user interaction with such other process in essentially the same manner as described herein. As such, the present invention can be utilized with any computing system requiring user controller input.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, the description and the drawing should not be considered in a limiting sense, as it is understood that the present invention is in no way limited to only the embodiments illustrated.

What is claimed is:

1. A method for generating a video game scene comprising:
processing a video game application in a host processor to generate a video game scene;
receiving input controller position information from an input controller into a memory of the host processor;
retrieving, by a graphics processor, the input controller position information from the memory of the host processor;
processing the generated game scene in the graphics processor by incorporating the retrieved input controller position information to generate a final video game scene without processing of the input controller position information by the video game application in the host processor; and
outputting the final video game scene to a display device.

2. The method for generating a video game scene of claim 1 wherein the received input controller position information is in the form of a transformation matrix.

3. A system for generating a video game scene comprising:
a host processor configured to generate a video game scene;
a host processor memory configured to store input controller position information received from an input controller; and
a graphics processor configured to receive the generated video game scene, configured to retrieve the stored input controller position information, and configured to process the generated video game scene by incorporating the retrieved input controller position information into a final video game scene without processing of the input controller position information by the host processor to generate the video game scene.

4. The system for generating a video game scene of claim 3 wherein the received input controller position information is in the form of a transformation matrix.

5. A method for generating a video game scene comprising:
processing a video game application in a host processor to generate a video game scene;
receiving input controller position information from an input controller into a memory of a graphics processor without the input controller position information first going through a memory of the host processor;
processing the generated video game scene in the graphics processor by incorporating the input controller position information from the memory of the graphics processor to generate a final video game scene without processing of the input controller position information by the video game application in the host processor; and
outputting the final video game scene to a display device.

6. The method for generating a video game scene of claim 5 wherein the received input controller position information is in the form of a transformation matrix.

7. A system for generating a video game scene comprising:
a host processor configured to generate a video game scene;
a graphics card configured to receive input controller position information from an input controller;
a graphics memory located on the graphics card configured to store the received input controller position information; and
a graphics processor located on the graphics card configured to receive the generated video game scene, configured to retrieve the stored input controller position information from the graphics memory, and configured to process the generated video game scene by incorporating the retrieved input controller position information into a final video game scene without processing of the input controller position information by the host processor to generate the video game scene.

8. The system for generating a video game scene of claim 7 wherein the received input controller position information is in the form of a transformation matrix.

* * * * *